United States Patent Office 2,973,381
Patented Feb. 28, 1961

---

2,973,381

METHOD OF STABILIZING GRANULAR PHOSPHATIDES

Ernest H. Tessmer, Jr., Niles, and Herbert T. Iveson, Elmhurst, Ill., assignors to Central Soya Company, Inc., Fort Wayne, Ind., a corporation of Indiana No Drawing. Filed May 18, 1959, Ser. No. 813,700

4 Claims. (Cl. 260—403)

This invention relates to a method of stabilizing granular phosphatides to provide improved keeping qualities. More specifically, it relates to a procedure for incorporating tocopherol in granular phosphatides.

This application is a continuation-in-part of our copending application, Serial No. 518,348, filed June 27, 1955.

Phosphatides, principally vegetable lecithin, have in recent years been purified and rendered oil-free, or substantially so, thereby providing a granular product convenient and suitable for use as a dietary supplement for human consumption. In its granular form it exposes appreciably more surface than in the less highly purified form where it possesses a thickly fluid or plastic condition. Exposure of more surface to oxygen of the air accelerates its deterioration, which gives rise to an unpleasant flavor. Since the granular product is packaged for home consumption and is distributed in much the same channels as many common food and dietary products, the prime producer must contemplate the elapse of several to many months between the time it is first packaged and the time when the ultimate consumer first opens the package. This period of time is ample to permit some or even appreciable deterioration in the flavor of the packaged granular product.

It has now been discovered that the keeping qualities, especially the fresh flavor, can be retained for a longer period of time than formerly by incorporating tocopherol in oil-free granular phosphatides.

Accordingly, it is an object of this invention to provide an improved granular phosphatide fortified against flavor deterioration through employing a novel procedure in which a minor proportion of tocopherol is added to the phosphatide.

It is another object to provide a process for improving the keeping qualities of granular phosphatides by introducing a stabilizing agent therewith during the manufacture thereof. Still another object is to provide a procedure of combining tocopherol with an oil-free phosphatide through the employment of an acetone carrier.

These and other objects will be understood from the following description of the invention.

As indicated above, the flavor deterioration of granular phosphatides has been a problem which has long eluded satisfactory commercial solution. The rancid flavor which develops in the course of time is believed to be due largely to oxidative reactions but is also known to be influenced not only by the contact of oxygen with the material but by exposure to heat and/or light. The rancid flavor was for some period of time attributed to rancidification of the vegetable oils contained therein, but after efforts were made to remove the oil as completely as possible with only slight improvement in keeping qualities, it became evident that the oil content was not entirely responsible for the development of off-flavor. In pursuing a solution to the problem, it has been found that subjecting oil-free phosphatides to contact with an acetone-tocopherol solution, followed by removal of the acetone, resulted in an unexpectedly stable phosphatide.

Although the mechanism by which the stability is achieved is but imperfectly understood, it is believed that the acetone cooperates with the phosphatide and tocopherol to provide a superior combination of the tocopherol and oil-free phosphatide, i.e., a combination in which the moieties are so arranged that maximum protection against flavor degradation is achieved. This combination can be advantageously effected when the phosphatides are "wetted" with acetone. Further, it can be achieved with a range of concentrations of the tocopherol in the acetone and likewise, a range of concentrations of the tocopherol relative to the oil-free phosphatide.

Excellent preservation of the phosphatides against undesirable deterioration is achieved through the use of as little as 0.1% tocopherol based on the weight of the oil-free phosphatide. Although even lower quantities may be satisfactorily employed in the practice of the invention, it is preferable to use quantities of tocopherol in the range of 0.1% to 0.5% in commercial production in order to achieve the desirable fortification. Optimum results are obtained when the weight percentage of tocopherol is in the range of 0.1% to 0.3% of the phosphatide. Some improvement in shelf-life of the phosphatides can be observed in increasing the tocopherol percentage from 0.1% to 0.2% indicating that, in commercial practice, it is desirable to make sure that each portion of the granular phosphatide is satisfactorily united with tocopherol.

The tocopherol employed for this purpose may be the commercial grade which is a mixture of the alpha, beta and gamma forms in an oil carrier. Such a product can be commercially obtained in which each unit of the product contains about 34% mixed tocopherols with the remainder being a glyceride oil. Of the 34% mixed tocopherols, about one-half is d-alpha tocopherol.

The tocopherol can be advantageously combined with acetone to form a solution suitable for spraying on the oil-free phosphatide, as during the grinding operation. For this, the tocopherol may range from about 3% to 20% of the weight of the solution—where the commercial tocopherol-oil mixture is employed, the mixture may constitute from 10% to 60% of the mixture-acetone solution. In small batch operations, best results are obtained with lower percentages.

The following example illustrates a procedure of preparing stabilized oil-free phosphatides embodying the principles of the invention.

EXAMPLE 1 kilogram of dried crude soy lecithin, containing about 35% soybean oil, was mixed with 150 ml. of acetone and then slowly poured into 5,000 ml. (5 liters) of acetone under constant mechanical agitation. Agitation was continued for about 10 minutes and then stopped to allow the phosphatides to settle. The supernatant acetone miscella containing soybean oil was decanted. Fresh acetone, 3,500 ml. (3.5 liters), was added, the mixture agitated for 10 minutes, then allowed to settle for 30 minutes, and the supernatant miscella again decanted. A third extraction was carried out in the same manner as the second. The acetone slurry derived as above, which contained about 30% washed soy phosphatides, was then filtered on a Büchner funnel under vacuum. The filter cake (about 40% acetone by weight) was granulated. During the granulation, the soy phosphatides were sprayed and intimately mixed with an acetone solution of commercial tocopherol which contained about 33% mixed tocopherols in an oil carrier. For this, 2.05 grams of commercial tocopherol were dissolved in 10 ml. of acetone. The acetone-wet phosphatides containing tocopherol were then dried in an oven at about 150°–200° F. A slight vacuum in the oven was maintained in order to expedite the drying. The dried product was then screened to provide a commercial product of uniform size.

Four different preparations of oil-free phosphatides were made. In one preparation, there was no spraying operation and no tocopherol was added. In the other three preparations, the tocopherol concentration was respectively, 0.1%, 0.2%, and 0.3%. The preparations were exposed to a strong light while being heated at 120° F. to provide an accelerated degradation test. The data obtained (in terms of peroxide value) is shown in the table below:

Table

| Preparation | 0 Days | 6 Days | 14 Days | 21 Days | 28 Days |
|---|---|---|---|---|---|
| Control (no tocopherol) | 12.5 | 18 | 90 | 105 | 150 |
| Control+.1% tocopherol | 10.0 | 15 | 46 | 60 | 60 |
| Control+.2% tocopherol | 10.0 | 12.5 | 30 | 30 | 30 |
| Control+.3% tocopherol | 10.0 | 10.0 | 28 | 35 | 35 |

On an accelerated test of this nature, material which has turned rancid has a peroxide value of about 100.

It has been found that the above-described procedure is especially suited for commercial production. The solvent employed for extracting the phosphatide oil from the phosphatide itself is also employed to dissolve the tocopherol so that problems of purification are minimized. It is to be understood that the term "oil-free" as applied to phosphatides is to be construed as referring to a commercial product which may contain residual quantities of the oil originally present in the crude phosphatide mixture prior to acetone washing. Obviously, the amount of residual oil will depend upon the efficiency of the washing operation.

While in the foregoing specification, we have set forth a detailed description of the invention for the purpose of illustrating an embodiment thereof, it will be understood that those skilled in the art may make many variations in the details herein given without departing from the spirit and scope of the invention.

We claim:

1. In a process for enhancing the stability of an oil-free phosphatide, the steps of adding an acetone solution of tocopherol to the phosphatide and subsequently removing the acetone.

2. In a method of improving the keeping qualities of granular, oil-free phosphatides, the steps of spraying the phosphatides with an acetone-tocopherol solution, the tocopherol being present in an amount up to about 0.5% of the weight of the phosphatides, and subsequently evaporating the acetone from the phosphatides.

3. The process of claim 2 in which the phosphatides are acetone-wet prior to the step of spraying.

4. In a method of improving the keeping qualities of granular, oil-free, soy phosphatides, the steps of extracting the oil moiety from a crude soy phosphatide through contacting the said crude soy phosphatide with acetone, subjecting the oil-free soy phosphatide to contact with an acetone-tocopherol solution in which the tocopherol is present in an amount of about 0.1% to 0.5% of the weight of the oil-free soy phosphatide, and subsequently evaporating the acetone from the tocopherol-contacted, oil-free soy phosphatide.

References Cited in the file of this patent

Food Mfgr., vol. 22, No. 12, December 1945, pp. 441 to 443.